No. 836,298. PATENTED NOV. 20, 1906.
H. M. BROOKFIELD.
PROCESS OF MAKING GLASS INSULATORS OR OTHER GLASS ARTICLES.
APPLICATION FILED APR. 22, 1903.
6 SHEETS—SHEET 1.

Henry M Brookfield
Inventor

No. 836,298. PATENTED NOV. 20, 1906.
H. M. BROOKFIELD.
PROCESS OF MAKING GLASS INSULATORS OR OTHER GLASS ARTICLES.
APPLICATION FILED APR. 22, 1903.

No. 836,298. PATENTED NOV. 20, 1906.
H. M. BROOKFIELD.
PROCESS OF MAKING GLASS INSULATORS OR OTHER GLASS ARTICLES.
APPLICATION FILED APR. 22, 1903.
6 SHEETS—SHEET 4.

Fig. 7.

WITNESSES:
Geo. M. Harris.
J. O. Gempler.

INVENTOR
Henry M. Brookfield
BY
Kenyon & Kenyon
ATTORNEYS

No. 836,298. PATENTED NOV. 20, 1906.
H. M. BROOKFIELD.
PROCESS OF MAKING GLASS INSULATORS OR OTHER GLASS ARTICLES.
APPLICATION FILED APR. 22, 1903.

WITNESSES:
Geo M Harris
J. O. Gempler

INVENTOR
Henry M. Brookfield
BY
Kenyon & Kenyon
ATTORNEYS

No. 836,298. PATENTED NOV. 20, 1906.
H. M. BROOKFIELD.
PROCESS OF MAKING GLASS INSULATORS OR OTHER GLASS ARTICLES.
APPLICATION FILED APR. 22, 1903.

WITNESSES:
Geo. M. Harris.
J. O. Gempler.

INVENTOR
Henry M. Brookfield
BY
Kenyon & Kenyon
ATTORNEYS

UNITED STATES PATENT OFFICE.

HENRY M. BROOKFIELD, OF NEW YORK, N. Y.

PROCESS OF MAKING GLASS INSULATORS OR OTHER GLASS ARTICLES.

No. 836,298.     Specification of Letters Patent.     Patented Nov. 20, 1906.

Application filed April 22, 1903. Serial No. 153,731.

*To all whom it may concern:*

Be it known that I, HENRY M. BROOKFIELD, a citizen of the United States, and a resident of the city, county, and State of New York, have invented certain new and useful Improvements in Processes of Making Glass Insulators or other Glass Articles, of which the following is a specification.

My invention relates to processes for making glass insulators or similar articles. Its object is to make the manufacture of such articles, from the discharge of the glass from the furnace to and through the annealing of such articles, a continuous operation and entirely or nearly automatic; also, to reduce the cost of the manufacture of such articles, to make their manufacture simpler, more certain, and accurate, and to improve the character and appearance of the finished articles.

It consists of the novel method herein shown and described.

I have shown in the drawings accompanying this specification and forming a part hereof an apparatus adapted for carrying out my improved process, although any other suitable apparatus may be employed, if desired.

Referring now to the special form of apparatus shown in the drawings.

Figure 2:
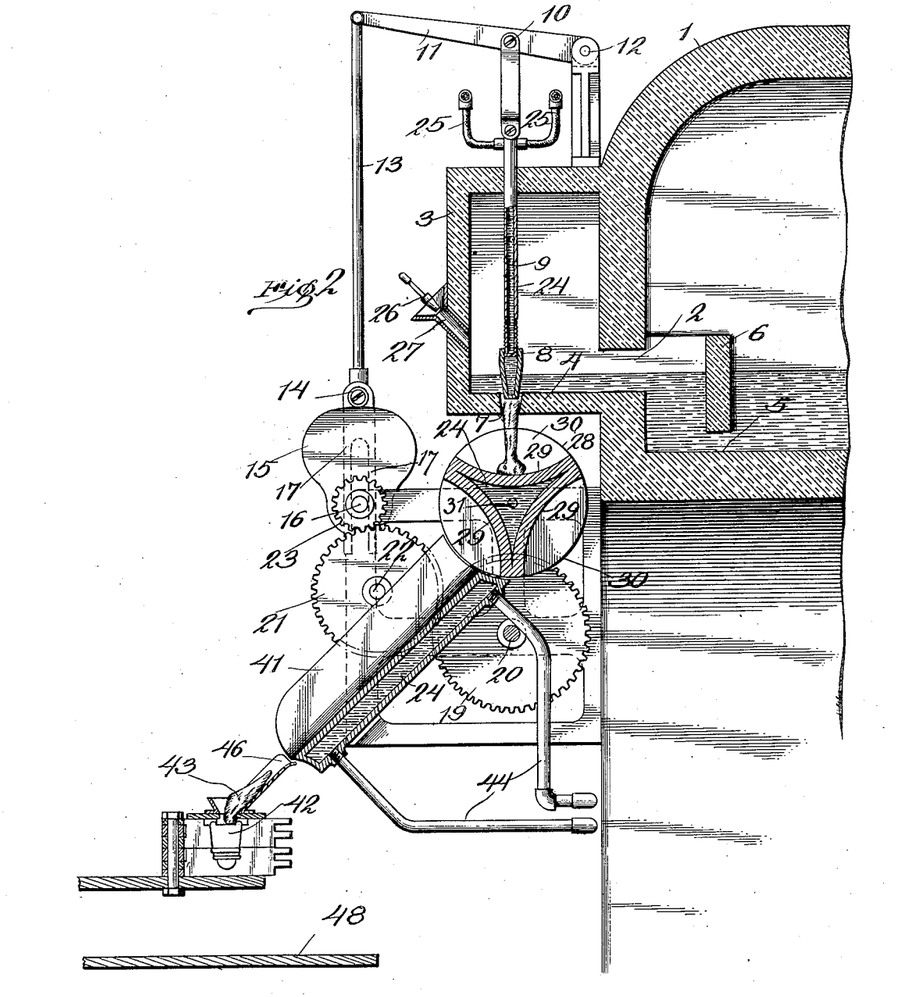
Fig. 2 is a longitudinal section through the said part of the furnace and the devices for feeding, measuring, and delivering the molten glass from the furnace to the molds.
Figure 5:
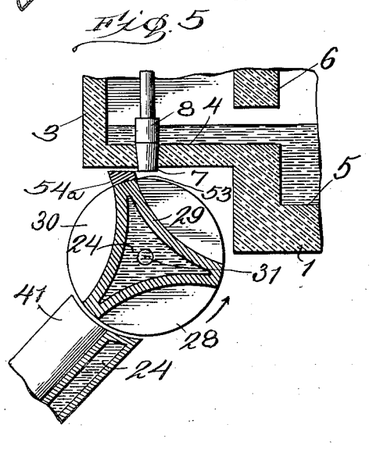
Fig. 5 shows a modification of the feeding and measuring devices.
Figure 6:
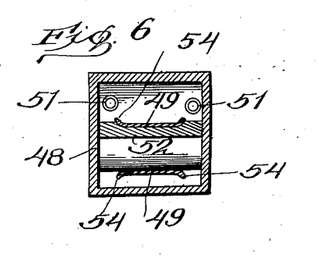
Fig. 6 is a cross-section taken through the leer.
Figure 7:
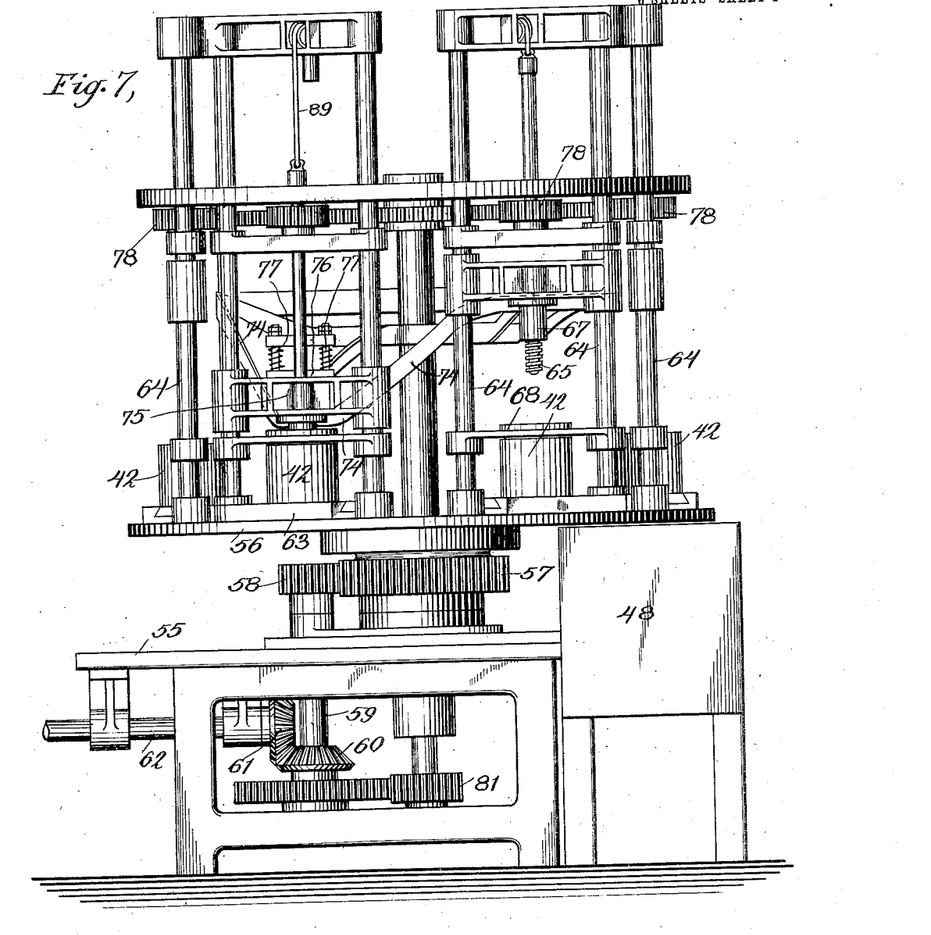
Figs. 7, 8, 9, and 10 represent detailed views of a press suitable for the automatic molding of the insulators and suitable means for automatically delivering the insulators from the molds to the leer, Fig. 7 being an elevation of the same, Fig. 8 a vertical section through the middle of the same, Fig. 9 a plan of the same mechanism, and Fig. 10 a plan view of the mold.
Figure 8:
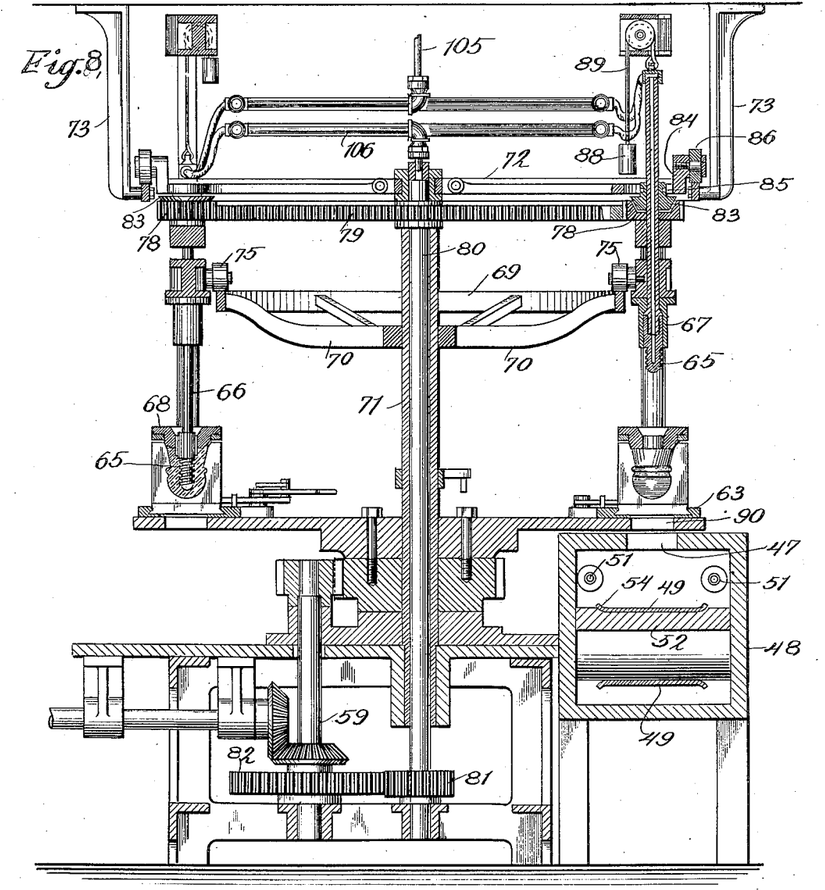

Referring now specifically to the apparatus shown in the drawings, 1 represents a glass-furnace. The furnace is provided, as shown in Figs. 2 and 5, with a discharge-chamber 3, whose floor 4 is raised above the level of the floor 5 of the main part of the furnace.

6 is a boot of ordinary construction to prevent the scum on the surface of the molten glass in the main part of the furnace from passing into the discharge-chamber.

Figure 1:
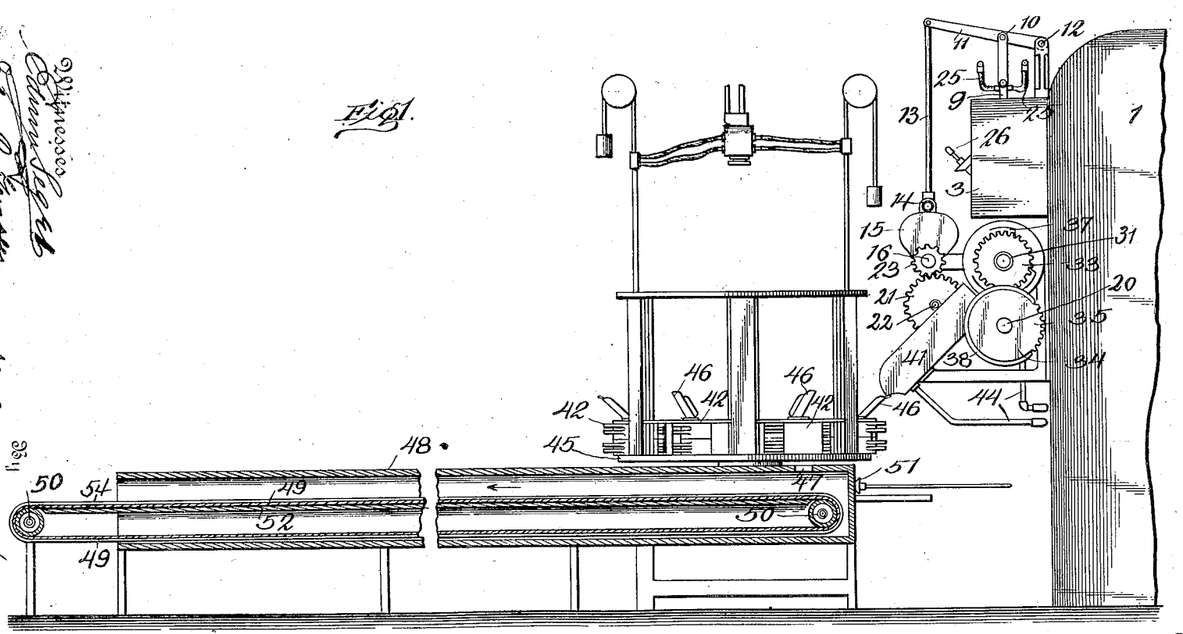
Figure 1 represents, partly in side elevation and partly in longitudinal section, a press and parts of a furnace for making glass insulators adapted for carrying out my improved process. Those parts of the press and the furnace having no direct connection with my improvement are omitted for the sake of clearness, the furnace being shown only in part.
Figure 3:
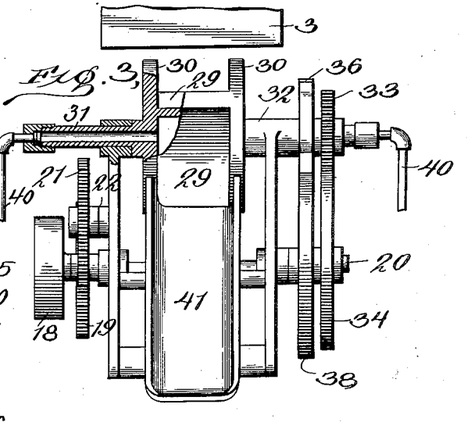
Fig. 3 is a front view, partly in section, of a part of the said feeding and measuring devices.

The floor 4 of the discharge-chamber is provided with an orifice 7, preferably beveled, as shown, for the better seating upon it of a valve 8. This valve controls the discharge of the molten glass from the furnace, and this valve may be raised from its seat or lowered upon it by any suitable means. As shown in Figs. 1 and 2, it is raised and lowered by the following-described mechanism. The rod 9, which carries valve 8, is pivotally secured at 10 to lever 11, fulcrumed at 12 and provided at its other end with a rod 13, carrying a roller 14, which runs upon a cam 15, mounted on shaft 16, fingers 17 of rod 13 embracing the shaft, as shown in Fig. 2, in the ordinary manner. Shaft 16 is driven from pulley 18, (see Fig. 3,) to which power is imparted from any suitable source through gear 19, mounted on the same shaft 20 which carries pulley 18, gear 21 turning on stud 22 and meshing with gear 19 and gear 23 on shaft 16. By these means valve 8 is automatically controlled and is kept open just the exact length of time necessary to permit the desired amount of molten glass to escape from the furnace. By changing the speed of the driving parts, or by adjusting the gearing, the amount of discharge can be accurately adjusted. I also prefer to make valve 8 adjustable upon rod 9, as by means of screw-threads, as shown in Fig. 2, in order to furnish an additional means of adjustment. Valve 8 is provided with beveled surfaces to seat upon the beveled surfaces of orifice 7, as shown in Fig. 2.

The above means furnish adjustable measuring devices for accurately separating the molten glass discharged from the furnace into masses of the exact amount desired.

26 is a burner of any suitable construction for throwing a jet of flame through orifice 27 upon the glass in the discharge-chamber to keep it at the proper temperature.

As shown in Fig. 2, rod 9 and valve 8 are hollow in order to receive a cooling medium 24, which cooling medium is supplied from any suitable source through pipes 25. This tends to prevent the surfaces of the rod and valve from becoming overheated.

Figure 4:
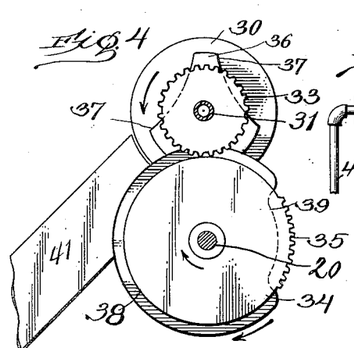
Fig. 4 is a detail or side view of part of the said mechanism.

I provide means for automatically delivering to the molds the molten glass as it is discharged in separate masses from the furnace. For the purpose I preferably provide a rotating receiver 28, adapted to receive the separated masses and remove them from the point of their discharge from the furnace, so that they may be delivered to the molds. In the preferred form shown the receiver is provided with a plurality of dished surfaces 29, each provided with bounding side walls 30. The receiver is mounted integral with shaft 31 in sleeves or bearings 32, carried by the framework of the machine, and shaft 31 is intermittently rotated through gear 33 and wheel 34, the latter having a segment 35, provided with gear-teeth, as shown in Fig. 4. Gear 34 is mounted on shaft 20 and at each revolution rotates the receiver in the form shown in the drawings one-third of a rotation, bringing a new dished surface into place to receive another mass of molten glass.

The receiving-surface is locked into position after each one-third revolution. For this purpose a disk 36 is mounted on shaft 31, provided with dished surfaces 37, corresponding to those of the receiver, and a disk 38 is mounted on shaft 20 to engage the surfaces 37, as shown in Fig. 4. A part of the periphery of disk 38 is cut away, as at 39. This cut-away portion is opposite to the toothed segment of wheel 34, as shown in Fig. 4. This arrangement unlocks the receiver-shaft at the time that gear 35 meshes with gear 33 and permits shaft 31 and the receiver with it to rotate one-third of a revolution.

The receiver may be composed of one or any number of receiving-surfaces and may be of any desired form or construction. As shown, it is composed of three receiving-surfaces. The interior of the receiver is preferably made hollow to receive a cooling medium 24, supplied to it through pipes 40 and the hollow interior of shaft 31. Unless the receiver is cooled the molten glass is liable to stick to its surfaces.

The molten glass can be removed from the receiver for delivery to the molds by any suitable means. As shown in the drawings, I provide for this purpose a trough 41, placed so that at each one-third rotation of the receiver the molten glass is emptied from one of the dished surfaces upon which it was fed into the trough and passes down through the trough into a mold 42. 43 in Fig. 2 is a mass of molten glass just passing into the mold. Trough 41 is cooled by any suitable cooling medium 24 through pipes 44 in order to prevent the sticking of the glass to its surface.

Molds of any suitable form or description may be employed, and these molds may be operated by hand or automatically in any well-known manner. As such mechanism forms no part of my main invention, I have merely represented in Fig. 1 a turn-table press 45 of well-known construction, provided with a series of molds 42. This table is rotated in any ordinary way, bringing each mold in turn opposite trough 41. I preferably provide an additional trough 46, fixed to each mold or to the turn-table at each mold, to carry the molten glass from trough 41 into the mold proper. The table is further rotated after the glass has been poured into the molds and the insulator made until the mold is opposite an opening 47 in a leer 48. For this purpose the leer is placed in close proximity to the turn-table of the press, its forward end being under the point where the insulators are discharged from the press. As the molds open and the insulators are discharged they fall through the opening 47 into the leer and upon a carrier 49, preferably endless and of any suitable construction, carried by rollers 50. Either one or both of these rollers is driven in any suitable manner to impart movement to the endless carrier. As such driving mechanism forms no part of the present invention and as it may be of any construction I have not shown it in the drawings.

Each insulator when it is discharged from the mold drops through an opening 47 upon the endless carrier and is carried in the direction of the arrow through the leer to the delivery or left-hand end, as shown in Fig. 1, where it is removed from the carrier. In the form of leer shown it is closed on all sides except the delivery end and except at the opening 47 and is heated in any suitable manner—as, for example, by burners 51, which are placed, preferably, at the forward end of the leer.

52 is a support for the upper portion of the endless carrier to prevent it from sagging under the weight of the insulators. The carrier is preferably provided with raised edges 54. The leer is made of sufficient length and the carrier is driven at such speed as to properly anneal the insulators while they are being carried through the leer.

In the form of my device heretofore shown and described the feeding and measuring devices for feeding and separating the glass into masses of the desired amount consist of a valve 8, rod 9, and the means for opening and closing the valve and for timing such movement, taken in connection with receiver 28 and its driving parts. If desired, however, valve 8 could be so arranged and connected as to be open during all the time the press is working and the glass be separated and measured by means of the rotating receiver. This method I prefer, and in Fig. 5 I have shown a modification constructed on this plan. Fig. 5 represents a longitudinal section through the receiver and a part of the furnace and trough. It is intended merely to illustrate without giving all the details and connections the modification last above referred to. In this case valve 8 can be opened and closed in any suitable way—as, for instance, by hand—and be left open during the operation of the press. A steady stream of molten glass will accordingly flow down onto the receiver. The receiver in such case will be rotated, preferably, continuously and at such a speed that from the time one edge 53 of the dished surface passes the opening 7 in the furnace until another edge 53 of the same dished surface passes the said point the exact amount of molten glass required for each insulator or other article will have flowed down through the opening upon the dished surface 29. A scraper 54ª, secured to the framework of the press in any suitable manner (not shown,) is arranged near the top of the receiver in close proximity to the left-hand end of opening 7, as seen in Fig. 5. This scraper is so arranged that it will press against each edge 53 and push or scrape the molten glass that may have fallen upon it back onto the next dished surface 29. Each mass of molten glass is emptied by its dished surface upon trough 41 in the manner already described.

By my improved process the manufacture of glass insulators or other glass articles can be made a continuous and automatic operation from the furnace to and through the annealing of the said articles. The process is a simple one, is accurate and certain, and produces insulators of an excellent quality and improved appearance. The cost of manufacture is largely reduced, as the process is, or may be made, entirely automatic, and all danger of injury to the said articles due to the handling of the insulators while still in a soft condition is removed.

The improved apparatus shown and described herein is not claimed in this application, as it forms the subject-matter of two other applications made by me—viz., applications Serial No. 82,368, filed November 15, 1901, and Serial No. 186,768, filed December 28, 1903.

In my improved process as carried out in its preferred form the steps are all taken automatically. If preferred, however, one or more of these steps may be performed manually. Thus, as to the steps of feeding the molten glass from the furnace, it is not, broadly speaking, essential to this feature of my invention that the operations of separating the molten glass into masses of the desired amount, or the delivery of the masses of the molten glass to the molds, or the delivery of the finished articles to the leer be automatic, one or more of them, and similarly to each of the other steps of separation, delivery to the molds or delivery to the leer, it is not essential that all or any of the other steps be automatic. Any other suitable devices than those shown in the drawings may of course be used to carry out my improved process.

As in my improved process in its preferred form the glass is discharged in a stream from the furnace and falls upon the separating devices, which are separated from and not in contact at all with the molten glass in the furnace, such separating devices can be easily cooled without chilling the molten glass as it flows out of the orifice of the furnace, and thereby clogging such orifice and stopping the flow. In my improved process no chilling of the stream or clogging of the orifice takes place. I am aware that attempts have been made to automatically feed molten glass from a furnace and to separate the glass into masses of the desired amount; but all such attempts, so far as I am informed, have been failures, because the separating devices have come in contact with the molten glass in the furnace, and such contact rapidly heats the metallic surfaces of the separating devices, causing the glass to stick to such surfaces and clog and stop the mechanism and render it wholly useless. Any attempt to cool such separating devices, on the other hand, would chill the molten glass at the point of its discharge from the furnace and would soon clog the discharge-orifice and wholly stop the flow of the glass. These troubles are completely overcome by my improved method.

Referring to the automatic press and delivering means of Figs. 7–10, inclusive, 55 is the base or support, and 56 a revolving table supported upon base 55 and free to revolve thereon. It is caused to revolve by a gear-wheel 57, secured to it and meshing with a gear 58 on shaft 59, the shaft carrying a beveled gear 60, which meshes with a beveled gear 61 upon shaft 62, the latter shaft being driven from any suitable source of power. By the above-described mechanism the table is continuously revolved upon the base or support. Upon the revolving table I mount any suitable number of molds 42. In the form shown in Figs. 7–9 six of these molds are shown. Each mold is supported on the table in guides 63. Table 56 also carries posts 64. 65 represents the screw-plungers, secured each to a spindle 66. 67 is a former loosely encircling the spindle, resting upon an interior shoulder (not shown) of screw-plunger 12 and free to move vertically upon the screw-plunger. 68 is the follower. This, as shown, is made integral with the frame which supports the mold, to which it is secured in any suitable manner. It is thus substantially an integral part of the mold itself.

In the operation of the press the former and plunger are brought down into engagement with the molten glass in the mold in order to shape the insulator, and the former is then withdrawn. Later, when the glass has sufficiently cooled, spindle 66 is rotated to draw the screw-plunger out of the insulator in the usual way. The spindle and plunger are then raised to their normal positions. These movements can be accomplished by any suitable means. Those shown consist of the following: The plunger, former, and spindle are actuated by means of two stationary cam-tracks 69, supported on brackets 70 and stationary post 71, which is secured to the base of the press, and cam-track 72, supported by brackets 73, secured to the ceiling. Cam 69 is for the purpose of lowering the plunger and former into the mold and of raising the former into its normal position, and cam 62 is for the purpose of withdrawing the plunger from the mold. Cam-track 69 has a depression 74 in one part of its length. Upon this cam-track runs a wheel 75, secured to former 67. When wheel 75 runs down into depression 74, the weight of former 67 causes it to fall and carry down with it screw-plunger 65, thus lowering both the screw-plunger and the former into the molten glass in the mold. To insure that the former and screw-plunger will be forced into the mold with the proper degree of pressure, I preferably insert at this point a cam 76, secured to the framework of the press in any suitable manner. It is arranged immediately over the lowest part of depression 74 in track 69 and at such a height above the track as to permit wheel 75 to pass between it and the track, thus forcing the former and plunger down into their proper positions in the mold. As shown, I preferably employ springs 77 to permit cam 76 to yield slightly. As the table continues to rotate, wheel 75 runs up the opposite side of depression 74 and raises the former out of the mold, bringing it back to its original position. Screw-plunger 65 is withdrawn from the mold by the rotation of spindle 66. This is accomplished by cam-track 72 by means of the following-described mechanism: Upon spindle 66 is loosely mounted a gear-wheel 78, secured to the framework of the press so as to be incapable of vertical motion. It meshes with a large gear-wheel 79, mounted upon a shaft 80, inside of post 71. At the lower end of shaft 80 is a gear-wheel 81, which meshes with gear 82 upon shaft 59. Large gear 79 is thus continuously driven by the driving mechanism of the press and from some source of power that revolves the table. The rotation of gear-wheel 78 is imparted to spindle 66 at the proper time by means of a clutch 83.

Figure 9:
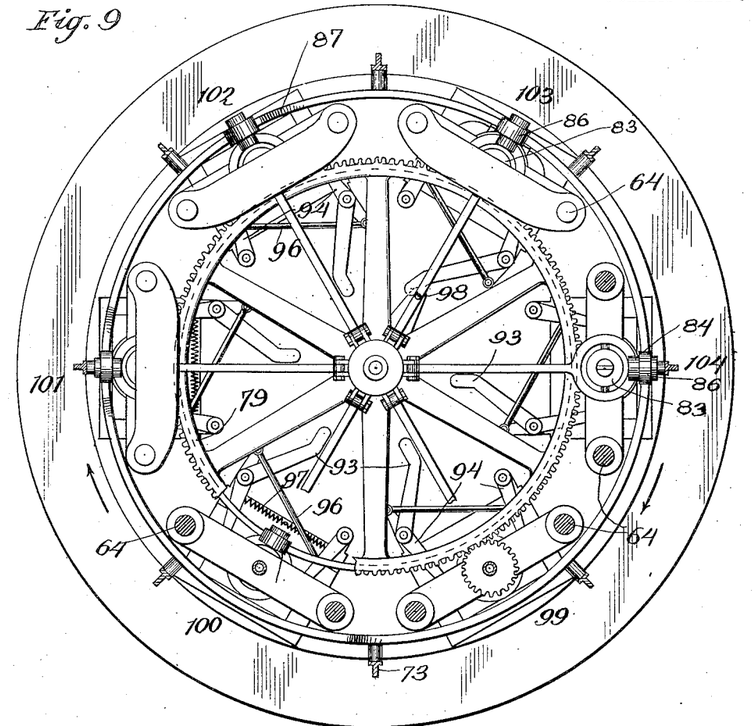
Figure 10:
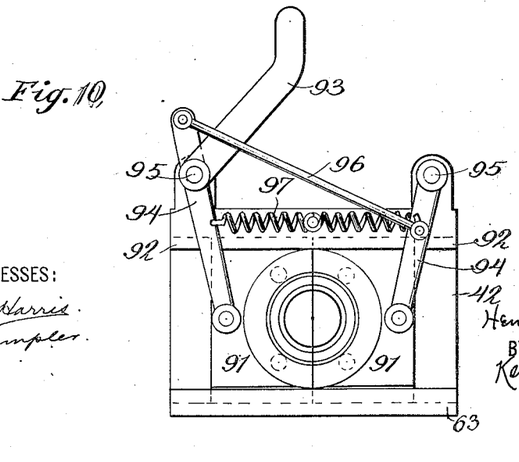

This clutch is splined to the spindle so as to be free to move vertically thereon, but is restrained from revolution around the same. The clutch is mounted in a support 84 by means of a collar 85 and is free to rotate on this collar. Support 84 is carried by a wheel 86, running upon cam-track 72. At one point of this cam-track—point 87—there is a depression in the track. When wheel 86 reaches this depression, it runs downward into it, forcing clutch 83 into engagement with gear-wheel 78 and causing spindle 66 to rotate. This depression is so placed in track 72 that the rotation of spindle 66 will be begun at the time in the revolution of the table when the glass in the mold has become sufficiently cooled and hardened to permit of the withdrawal of the screw-plunger therefrom. As soon as screw-plunger 65 is disengaged from the glass in the mold a weight 88 at the end of a cord 89, running over a pulley and secured at its other end to the upper part of spindle 66, raises the spindle and screw-plunger to their original position. At substantially the same time the mold is automatically opened to permit the completed insulator to fall from the mold through an opening 90 and through the opening 47 in the leer onto endless chain 49. In order to thus automatically discharge the insulator from the mold and into the leer and upon the endless chain of the same, I preferably make the mold of separable parts, which together form the completed mold, and I provide means for separating these parts. The parts above referred to can be of any suitable form and operate in any suitable manner. In the form shown I have made the mold of two separable halves 91 91. Each half is movable bodily and directly away from the other half in guides 92 of the frame 4 of the molds. These parts are moved away from each other by means of a lever 93. This is so arranged that when it is forced one way it will separate the two halves. The means shown for connecting this lever with the halves consist of levers 94 94, each secured at one end to one of the halves and fulcrumed at 95 to the framework. Lever 93 is fixedly secured to one of the levers 94 at point 95, and the two levers are connected by a rod 96. Springs 97, secured to levers 94 and to the frame, tend to pull the two halves of the mold together and to keep them together. The mold is opened automatically by means of a pin 98, Fig. 9, upon the stationary framework of the press, the end of lever 93 making contact therewith as the table revolves, as shown in Fig. 9. Pin 98 is arranged in the framework at such a point that the mold will be automatically opened immediately after the screw-plunger has been withdrawn from the mold and while the mold is over the openings 90 and 94. After this operation the mold and its connecting parts are in their original position ready to receive another supply of molten glass, all the parts being ready for a repetition of the operation just described. In practice molten glass from the trough 41 is automatically poured in a measured mass into the mold of the revolving table at point 99, Fig. 9. The table revolves in the direction indicated by the arrow in Fig. 9. The screw-plunger and former are automatically lowered into the mold at the position 100, (indicated in Fig. 9.) The former is then raised from the mold at position 101. The spindle is then rotated and the screw-plunger unscrewed from the glass at the position 102. The mold is then automatically opened and the insulator automatically delivered to the leer at the position indicated by 103, Fig. 9, which is the position illustrated at the right in Fig. 8. The springs 97 thereafter pull the two halves of the mold together, bringing them into their original position corresponding with the position 104 of Fig. 9. Any suitable means for preventing the overheating of the screw-plunger may be used. The details of this are not given, the supply-pipe 105 and the discharge pipe 106 and some of their connecting parts being indicated in Fig. 8.

By the means thus described the insulators or other similar glass articles are automatically molded and are automatically discharged from the press and delivered to the leer.

What I claim as new, and desire to secure by Letters Patent, is—

1. The process of making glass insulators or other similar small glass articles, which consists in discharging the molten glass from the furnace, automatically separating the glass into measured masses of the desired amount, cooling the devices employed in such separation, automatically delivering each separated mass of glass into a mold, forming the glass insulators or other articles therein, discharging the finished article from the mold directly into a leer, and annealing such article.

2. The process of making glass insulators or other similar small glass articles, which consists in discharging the molten glass from the furnace in a stream, automatically separating the glass into measured masses of the desired amount, cooling the devices employed in such separation, automatically delivering each separated mass of glass into a mold, forming the glass insulators or other article therein, discharging the finished article from the mold directly into a leer, and annealing such article.

3. The process of making glass insulators or other similar small glass articles, which consists in discharging the molten glass from the furnace in a stream and directly upon the devices used for separating the glass, automatically separating the glass into measured masses of the desired amount, cooling the devices employed in such separation, automatically delivering each separated mass of glass into a mold, forming the glass insulators or other article therein, discharging the finished article from the mold directly into a leer, and annealing such article.

4. The process of making glass insulators or other similar small glass articles, which consists in automatically discharging the molten glass from the furnace in a stream upon measuring devices not in contact with the molten glass in the furnace, automatically separating the glass into measured masses of the desired amount, cooling the devices employed in such separation, automatically delivering each separated mass of glass into a mold, cooling such delivering means, forming the glass insulators or other articles, discharging the finished article from the mold directly into a leer, automatically conveying such articles through the leer and annealing the same.

5. The process of making glass insulators or other similar small glass articles, which consists in discharging the molten glass from the furnace, reheating the glass at the point of its discharge from the furnace, automatically separating the glass into measured masses of the desired amount, cooling the separating means, and molding the glass insulators or other articles.

6. The process of making glass insulators or other similar small glass articles, which consists in forming the said articles in molds, discharging them from the molds directly into a leer and annealing such articles.

7. The process of making glass insulators or other similar small glass articles, which consists in forming the said articles in molds, discharging them from the molds directly into a leer, conveying them through the leer and annealing such articles.

8. The process of making glass insulators or other similar small glass articles, which consists in discharging the molten glass from the furnace, separating the glass into measured masses of the desired amount, delivering each separated mass of glass into a mold, forming the glass insulators or other article therein, discharging the finished article from the mold directly into a leer, and annealing such article.

9. The process of automatically making glass insulators or other similar small glass articles, which consists in automatically discharging the molten glass from the furnace, automatically separating the glass into measured masses of the desired amount, automatically delivering each separated mass of glass into a mold, forming the glass insulators or other articles therein, automatically discharging the finished article from the mold directly into a leer, and annealing such article.

10. The process of making glass insulators or other similar small glass articles, which consists in forming the said articles in molds, automatically discharging them from the molds directly into a leer, and annealing such articles.

In testimony whereof I have signed my name to this specification in the presence of two subscribing witnesses.

HENRY M. BROOKFIELD.

Witnesses:
 EDWIN SEGER,
 JOHN O. GEMPLER.